United States Patent
Hishida et al.

(10) Patent No.: US 11,124,084 B2
(45) Date of Patent: Sep. 21, 2021

(54) CONTROL APPARATUS, AND COMPUTER-READABLE STORAGE MEDIUM

(71) Applicant: HONDA MOTOR CO., LTD., Tokyo (JP)

(72) Inventors: Motoki Hishida, Saitama (JP); Hakaru Sadano, Saitama (JP); Hiroyuki Kanazawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 96 days.

(21) Appl. No.: 16/726,954

(22) Filed: Dec. 26, 2019

(65) Prior Publication Data

US 2020/0231059 A1    Jul. 23, 2020

(30) Foreign Application Priority Data

Jan. 17, 2019  (JP) .............................. JP2019-005690

(51) Int. Cl.

| B60L 53/62 | (2019.01) |
| H02J 7/34 | (2006.01) |
| B60L 53/63 | (2019.01) |
| B60L 50/60 | (2019.01) |
| H02J 3/32 | (2006.01) |

(52) U.S. Cl.
CPC ............... B60L 53/62 (2019.02); B60L 50/66 (2019.02); B60L 53/63 (2019.02); H02J 3/322 (2020.01); H02J 7/342 (2020.01)

(58) Field of Classification Search
None
See application file for complete search history.

(56) References Cited

U.S. PATENT DOCUMENTS

| 2018/0241234 A1* | 8/2018 | Liang ...................... B60L 53/65 |
| 2019/0023259 A1* | 1/2019 | Huh ....................... B60W 10/26 |
| 2020/0160709 A1* | 5/2020 | Ramot ................. G06Q 10/109 |

FOREIGN PATENT DOCUMENTS

| JP | 5595456 B2 | 9/2014 |
| JP | 5714073 B2 | 5/2015 |

* cited by examiner

*Primary Examiner* — Jared Fureman
*Assistant Examiner* — Joel Barnett

(57) ABSTRACT

A control apparatus includes: a vehicle information acquiring unit that acquires information indicating a future movement destination of a vehicle provided with a driving power source; and a control unit that causes power transfer to be performed between the vehicle and a second vehicle provided with a driving power source based on a power demand in a power network that supplies power in a region of the future movement destination of the vehicle.

14 Claims, 12 Drawing Sheets

| VEHICLE ID | SCHEDULED PERIOD | CONNECTION DESTINATION ID |
|---|---|---|
| V100 | 2018/10/1 19:00 ~ 2018/10/1 21:00 | C100 |
| V100 | 2018/10/2 19:00 ~ 2018/10/2 21:00 | C100 |
| V101 | 2018/10/1 10:00 ~ 2018/10/1 12:00 | C101 |
| ⋮ | ⋮ | ⋮ |

*FIG. 3*

| VEHICLE ID | TIME | BATTERY SOC | VEHICLE POSITION | VEHICLE STATE |
|---|---|---|---|---|
| V100 | t1 | SOC1 | P1 | STOPPED |
| V100 | t2 | SOC2 | P2 | STARTED TRAVELLING |
| V100 | t3 | SOC3 | P3 | TRAVELLING |
| V100 | t4 | SOC4 | P4 | STOPPED |
| V100 | t5 | SOC5 | P5 | STARTED CHARGING |
| ⋮ | ⋮ | ⋮ | ⋮ | ⋮ |

*FIG. 4*

| VEHICLE ID1 | VEHICLE ID2 | PERIOD | POWER TRANSFER AMOUNT | POINTS |
|---|---|---|---|---|
| V101 | V100 | 2018/9/1 9:15 ~ 2018/9/1 9:20 | 1kWh | 3 |
| . . . | . . . | . . . | . . . | . . . |

FIG. 5

| VEHICLE ID | CONNECTION DESTINATION ID | CONNECTION PERIOD | POWER TRANSFER AMOUNT | POINTS |
|---|---|---|---|---|
| V100 | C100 | 2018/9/1 18:00 ~ 2018/9/1 22:00 | 6kWh | 8 |
| V100 | C100 | 2018/9/2 19:00 ~ 2018/9/2 21:00 | 0kWh | 2 |
| V101 | C101 | 2018/9/1 10:00 ~ 2018/9/1 12:00 | 12kWh | 14 |
| ... | ... | ... | ... | ... |

*FIG. 6*

| VEHICLE ID | LOWER LIMIT CAPACITY | UPPER LIMIT CAPACITY |
|---|---|---|
| V100 | 30kWh | 50kWh |
| V101 | 20kWh | 50kWh |
| ⋮ | ⋮ | ⋮ |

*FIG. 7*

CONTROL APPARATUS, AND COMPUTER-READABLE STORAGE MEDIUM

The contents of the following Japanese patent application are incorporated herein by reference: 2019-005690 filed on Jan. 17, 2019

BACKGROUND

1. Technical Field

The present invention relates to a control apparatus, and a computer-readable storage medium.

2. Related Art

There are known battery charge/discharge systems that control a rechargeable capacity of a battery of an electric vehicle before the electric vehicle is connected to a charge/discharge PCS (see Patent Literature 1 explained below, etc., for example).

PRIOR ART LITERATURES

Patent Literatures

[Patent Literature 1] Japanese Patent No. 5595456
[Patent Literature 2] Japanese Patent No. 5714073

SUMMARY

In a system that performs power transfer between power networks and vehicles having driving power sources, it is desired that, in a power network with high power demand, there is a vehicle with a large remaining power amount in a driving power source. Conversely, it is desired that, in a power network in which an excess of power occurs, there is a vehicle with a small remaining power amount in a driving power source.

BRIEF DESCRIPTION OF THE DRAWINGS

FIG. 3 illustrates, in a table format, one example of schedule information stored in a schedule information storage unit 282.

FIG. 4 illustrates, in a table format, one example of movement history information stored in a history storage unit 284.

FIG. 5 illustrates, in a table format, one example of inter-vehicle power transfer history information stored in the history storage unit 284.

FIG. 6 illustrates, in a table format, one example of connection history information stored in the history storage unit 284.

FIG. 7 illustrates, in a table format, one example of user information stored in a user information storage unit 286.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. Note that the identical or similar portions in drawings are given the same reference numbers, and repetitive explanations are omitted in some cases.

Figure 1:
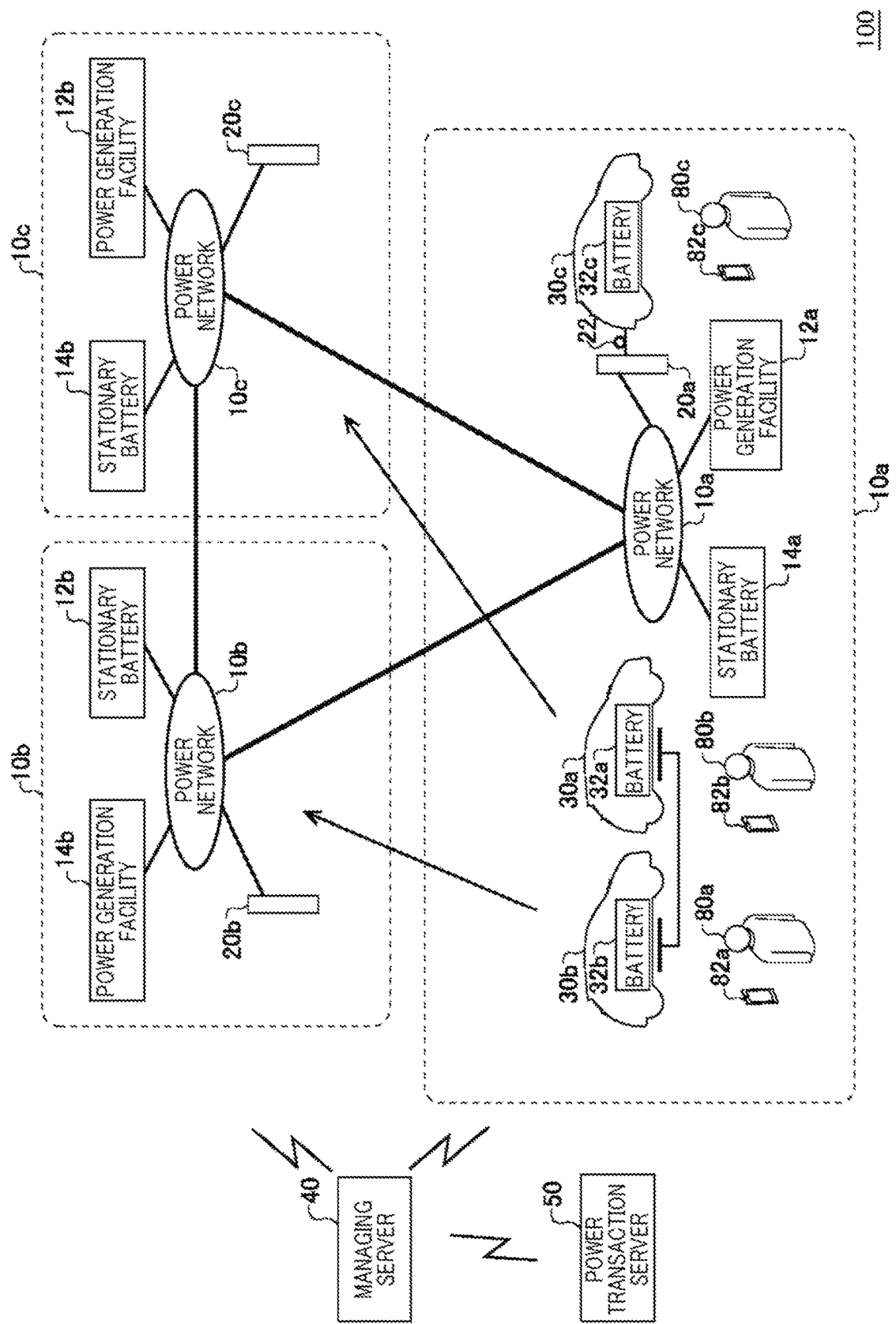
FIG. 1 schematically illustrates the basic configuration of a power transfer system 100.

FIG. 1 schematically illustrates the basic configuration of a power transfer system 100. The power transfer system 100 is a system for a power aggregator, for example, to perform V2G (Vehicle-to-Grid) for exchange of power between vehicles and a power network by using batteries provided to the vehicles. The power transfer system 100 has a function of performing control such that vehicles capable of coping with power supply/demand of the power network gather. Note that, in V2G, at least either release of power by a vehicle to the power network or reception of power by a vehicle from the power network is performed.

The power transfer system 100 includes: a plurality of vehicles including a vehicle 30a, a vehicle 30b, and a vehicle 30c; a plurality of stationary batteries including a stationary battery 14a, a stationary battery 14b, and a stationary battery 14c; a plurality of charge/discharge facilities including a charge/discharge facility 20a, a charge/discharge facility 20b, and a charge/discharge facility 20c; a plurality of power generation facilities including a power generation facility 12a, a power generation facility 12b, and a power generation facility 12c; a plurality of user terminals including a user terminal 82a, a user terminal 82b, and a user terminal 82c; and a managing server 40.

A user 80a is a user of the vehicle 30a, a user 80b is a user of the vehicle 30b, and a user 80c is a user of the vehicle 30c. Note that a user of a vehicle may be any person who uses the vehicle such as an owner of the vehicle or a family member of the owner. In the present embodiment, the user 80a, and user 80b are generally called a "user 80" in some cases.

The user terminal 82a is a communication terminal used by the user 80a. The user terminal 82b is a communication terminal used by the user 80b. The user terminal 82c is a communication terminal used by the user 80c. The plurality of user terminals including the user terminal 82a, user terminal 82b, and user terminal 82c are generally called a "user terminal 82" in some cases.

The user terminal 82 may be a mobile terminal, a personal computer, a vehicle navigation device, or the like, for example. Examples of the mobile terminal include a mobile phone, a smartphone, a PDA, a tablet, a notebook computer, a laptop computer, a wearable computer, and the like.

The vehicle 30a includes a battery 32a. The vehicle 30b includes a battery 32b. The vehicle 30c includes a battery 32c. In the present embodiment, the plurality of vehicles including the vehicle 30a, vehicle 30b, and vehicle 30c are generally called a "vehicle 30" in some cases. In addition, a plurality of batteries including the battery 32a, battery 32b, and battery 32c are generally called a "battery 32" in some cases. The battery 32 may be any of various secondary batteries such as lithium ion batteries or nickel hydrogen batteries.

Note that the battery 32 is one example of a driving power source of the vehicle 30. The driving power source includes a power source that, like a fuel cell or the like, consumes a fuel to generate electric energy to be provided to a motive power source of the vehicle 30. The fuel may be hydrogen, a hydrocarbon fuel such as gasoline, light oil or natural gas, an alcohol fuel, or the like. The driving power source may be any power source that can generate electric energy to be provided to a motive power source of the vehicle 30.

The vehicle 30 is one example of a transportation device. The vehicle 30 is a vehicle including a motive power source to be driven by electric energy, such as an electric vehicle or a fuel cell vehicle (FCV), for example. Electric vehicles include a battery electric vehicle (BEV), a hybrid vehicle or plug-in hybrid electric vehicle (PHEV) including an internal combustion engine to provide at least part of motive power. In the present embodiment, the vehicle 30 is an electric vehicle including the battery 32 as a driving power source. In the form employing a battery as a driving power source, battery discharge corresponds to energy release from the driving power source, and battery charge corresponds to energy accumulation in the driving power source.

A power network 10*a*, a power network 10*b*, and a power network 10*c* are power transmission systems or power distribution systems of a power system, or power distribution networks of a power grid. The power network 10*a*, power network 10*b*, and power network 10*c* are generally called a "power network 10" in some cases. The power network 10 may be provided for each region. The power network 10 may be a micro grid. The power network 10 may be a power distribution network of any scale that connects power devices that consume power, and power sources. For example, the power network 10 may be a power distribution network provided to any of facilities such as commercial facilities. The power network 10 may be provided for each building. The power network 10 may be provided for each building. Power networks 10 may be interconnected by interconnection lines and the like.

The power generation facility 12*a* supplies power to the power network 10*a*. The power generation facility 12*b* supplies power to the power network 10*b*. The power generation facility 12*c* supplies power to the power network 10*c*. The power generation facility 12*a*, power generation facility 12*b*, and power generation facility 12*c* are generally called a "power generation facility 12" in some cases. Power generation facilities 12 are each managed by a power provider such as an electric power company.

The charge/discharge facility 20*a* is connected to the power network 10*a*, and charges the battery 32 of the vehicle 30 or causes the battery 32 of the vehicle 30 to discharge power. The charge/discharge facility 20*b* is connected to the power network 10*b*, and charges the battery 32 of the vehicle 30 or causes the battery 32 of the vehicle 30 to discharge power. The charge/discharge facility 20*c* is connected to the power network 10*c*, and charges the battery 32 of the vehicle 30 or causes the battery 32 of the vehicle 30 to discharge power. The charge/discharge facility 20*a*, charge/discharge facility 20*b*, and charge/discharge facility 20*c* are generally called a "charge/discharge facility 20" in some cases. Charge/discharge facilities 20 include, for example, a charger/discharger installed at a residence, a charge/discharge station installed at a parking lot or public space of a multi-dwelling unit, a building or a commercial facility, and the like. The charge/discharge facility 20 is one example of power transfer facilities for performing power transfer between the vehicle 30 and the power network 10. In addition, the charge/discharge facility 20, and stationary battery 14 are each one example of electric facilities for accumulating energy in the driving power source provided to the vehicle 30.

The stationary battery 14*a* is connected to the power network 10*a*, and performs charge/discharge with the power network 10*a*. The stationary battery 14*b* is connected to the power network 10*b*, and performs charge/discharge with the power network 10*b*. The stationary battery 14*c* is connected to the power network 10*c*, and performs charge/discharge with the power network 10*c*. The stationary battery 14*a*, stationary battery 14*b*, and stationary battery 14*c* are generally called a "stationary battery 14" in some cases.

In each of the power networks 10, the charge/discharge facility 20, stationary battery 14, and power generation facility 12 are capable of power transfer with the power network 10 to which they are connected. The vehicle 30 can move between regions where power is provided by the power networks 10. The vehicle 30 is connected to any of the charge/discharge facilities 20, and can perform charge or discharge of the battery 32.

The managing server 40 is capable of communication with the vehicle 30, stationary battery 14, and user terminal 82 through a communication network. The managing server 40 is also capable of communication with a power transaction server 50 through a communication network. The communication networks may include wired communication or wireless communication transmission paths. The communication networks may include communication networks including the Internet, a P2P network, a dedicated line, a VPN, a power line communication line, a mobile phone line, and the like.

The vehicle 30 is connected to the charge/discharge facility 20 through a charge/discharge cable 22. That is, the vehicle 30 is connected to the power network 10 through the charge/discharge cable 22, and charge/discharge facility 20. The vehicle 30 performs power transfer between the battery 32 and the power network 10 through the charge/discharge facility 20. For example, the vehicle 30 releases power obtained by discharge of the battery 32 to the power network 10 via the charge/discharge cable 22, and charge/discharge facility 20. In addition, the vehicle 30 charges the battery 32 with power supplied from the power network 10 via the charge/discharge cable 22, and charge/discharge facility 20. Note that transfer of power between an entity and a power network 10 is called "power transfer with the power network 10" and the like in some cases.

The stationary battery 14 is managed by the power aggregator. The battery 32 of the vehicle 30 forms a virtual power plant along with the stationary battery 14. The managing server 40 is managed by the power aggregator. The managing server 40 controls power transfer between the battery 32 and the power network 10, and between the stationary battery 14 and the power network 10.

The managing server 40 performs power transaction by bidding in a wholesale power market. The power transaction server 50 is managed by an operator of the wholesale power market. The length of each time segment is defined as 30 minutes, and the managing server 40 places a bid in the power transaction server 50 in every time segment. The managing server 40 causes the battery 32, and stationary battery 14 to discharge power in each time segment based on a contract result to supply the power to the power network 10.

For example, the managing server 40 causes the battery 32, and stationary battery 14 to discharge power according to a contract amount which is a result of bidding in the wholesale power market by the power aggregator to supply the power network 10 with the power released from the battery 32, and stationary battery 14. In addition, the managing server 40 controls charge/discharge of the battery 32, and stationary battery 14 to balance power supply and demand in the power network 10 to an extent of the balancing power agreed in a transaction which is a result of bidding in the supply/demand balancing market by the power aggregator. For example, the managing server 40 controls charge/discharge of the battery 32, and stationary battery 14 according to an increased-demand response (increased-DR), a decreased-demand response (decreased-DR), and a increased/decreased-demand response (increased/decreased-DR) requested by a power transmission/distribution company or a retail electricity supplier.

Specifically, the managing server 40 controls at least one of the vehicle 30 and the charge/discharge facility 20 according to a increased-DR to thereby charge the battery 32 of the vehicle 30 with power received from the power network 10 through the charge/discharge facility 20. In addition, the managing server 40 controls at least one of the vehicle 30 and the charge/discharge facility 20 according to a decreased-DR to thereby cause the battery 32 of the vehicle 30 to discharge power, and cause the power obtained by the discharge of the battery 32 to be released toward the power network 10 through the charge/discharge facility 20.

In the present embodiment, the managing server 40 acquires a predicted value of power supply/demand in the power network 10 of each time segment in the future. In addition, the managing server 40 identifies a region of a future movement destination of the vehicle 30, and a period over which the vehicle 30 will be kept stopped in the region of the movement destination. For example, the managing server 40 identifies the region of the movement destination of the vehicle 30, and the time segment over which the vehicle 30 will be kept stopped in the region, based on movement history information of the vehicle 30*a*, destination information set in a navigation device of the vehicle 30, and the like. It is assumed here that the movement destination of the vehicle 30*a* is a region where the power network 10*b* is responsible for power supply. In this case, if it is highly likely that there will be a shortage of power in the power network 10*b* during a period over which the vehicle 30*a* will be present in the region of the power network 10*b*, the managing server 40 supplies power to the vehicle 30*a* from the vehicle 30*b* to charge the battery 32*a* of the vehicle 30*a*. For example, the battery 32*a* of the vehicle 30*a* is charged through vehicle-to-vehicle charge (V2V: Vehicle to Vehicle) from the vehicle 30*b* to the vehicle 30*a*. Vehicle-to-vehicle charge may be performed while vehicle are stopped or while vehicles are travelling, through wireless charge/discharge devices provided under traffic lanes of roads or provided at any other locations. In addition, vehicle-to-vehicle charge may be performed through wireless charge/discharge devices provided to the vehicle 30*a*, and the vehicle 30*b* during a period while they are stopped waiting for a traffic light or for any other reason. Thereby, the vehicle 30*a* can be provided with power through the power network 10*b* after the vehicle 30*a* moved to the movement destination.

Note that, in the present embodiment, power transfer between the vehicle 30 and the power network 10 means that power exchange from at least one of the vehicle 30 and the power network 10 to the other occurs. For example, power transfer may mean that power release is performed from the vehicle 30 toward the power network 10. In addition, power transfer may mean that power transmission is performed from the power network 10 toward the vehicle 30. Note that if the vehicle 30 releases power through a charger/discharger installed at a power consumer such as a home, net power supply to the power network 10 does not occur at a connection point between the power consumer's side and the power network 10 when the power consumption on the power consumer's side is greater than the power released from the vehicle 30, and the amount of power supply from the connection point to the power consumer simply decreases in some cases. In this case also, it can be considered that power exchange has occurred with the outside of the power network 10 from the perspective of the power network 10. Accordingly, it does not matter in the present embodiment whether or not the power network 10 receives net power from a particular connection point between the power network 10 and the vehicle 30 in power transfer with the power network 10 in which the vehicle 30 releases power.

Figure 2:
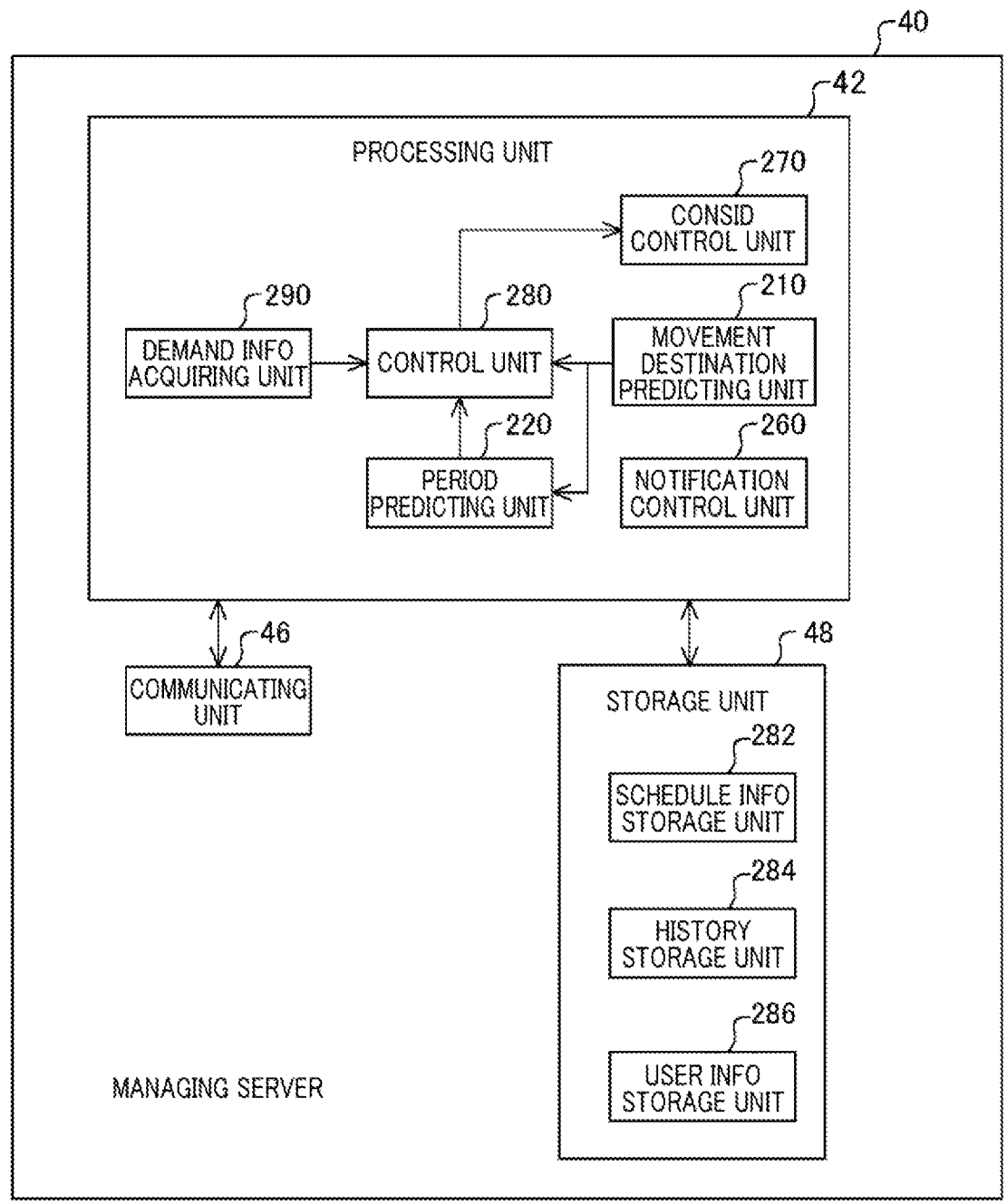
FIG. 2 schematically illustrates the functional configuration of a managing server 40.

FIG. 2 schematically illustrates the functional configuration of the managing server 40. The managing server 40 includes a processing unit 42, a storage unit 48, and a communicating unit 46.

The processing unit 42 is realized by a processing device including a processor. The storage unit 48 is realized by a nonvolatile storage device. The processing unit 42 performs processes by using information stored in the storage unit 48. The communicating unit 46 is responsible for communication with the vehicle 30, stationary battery 14, user terminal 82, and power transaction server 50. Information received by the communicating unit 46 from the vehicle 30, stationary battery 14, user terminal 82, and power transaction server 50 is supplied to the processing unit 42. In addition, information to be sent to the vehicle 30, stationary battery 14, user terminal 82, and power transaction server 50 is generated by the processing unit 42, and sent via the communicating unit 46.

The managing server 40 functions as a control apparatus. The managing server 40 may be a system realized by one information processing device, or may be a system realized by a plurality of information processing devices.

The processing unit 42 includes a movement destination acquiring unit 210, a period predicting unit 220, a notification control unit 260, a consideration control unit 270, a control unit 280, and a demand information acquiring unit 290.

The storage unit 48 includes a schedule information storage unit 282, a history storage unit 284, and a user information storage unit 286. The schedule information storage unit 282 stores information about a schedule of connection of the vehicle 30 to a charge/discharge facility 20. The schedule information includes identification information of a charge/discharge facility 20 to which the vehicle 30 is connected in the future, and information indicating a period over which the vehicle 30 is kept connected to the charge/discharge facility 20 in the future. The schedule information may be generated by the managing server 40 acquiring, from the user terminal 82, information registered with the user terminal 82 by the user 80. The history storage unit 284 stores history information including movement history information of the vehicle 30, and history information about connection between the vehicle 30 and the charge/discharge facility 20.

The movement destination acquiring unit 210 acquires information indicating a future movement destination of the vehicle 30. For example, the movement destination acquiring unit 210 predicts the future movement destination of the vehicle 30. The movement destination acquiring unit 210 may predict the future movement destination of the vehicle 30 based on the movement history information stored in the history storage unit 284. The movement destination acquiring unit 210 may predict the future movement destination of the vehicle 30 based on the schedule information stored in the schedule information storage unit 282.

The demand information acquiring unit 290 acquires information indicating power demand in each of the power networks 10. The information indicating the power demand may be, for example: information indicating an amount of power that can be supplied from the power generation facility 12 to the power network 10; information indicating a power demand amount in the power network 10; information indicating the difference between the amount of power that can be supplied from the power generation facility 12 to the power network 10, and the power demand amount in the power network 10; or the like. The information indicating the power demand may be information indicating demand for balancing power in each of the power networks 10.

Note that the contract amount in power transaction mentioned above is one example of the information indicating the power demand. The information indicating the power demand may be a contract price in power transaction or a contract type indicating whether a transaction is a buy contract or a sell contract. In addition, the information indicating the power demand may be information indicating a predicted value of an amount of future imbalance between supply and demand. The information indicating the power demand may be information indicating a predicted value of power consumption of the power network 10 at a power consumer. Information that can be applied to the information indicating the power demand is not limited to power amounts themselves, but include various types of information that directly or indirectly affects power demand such as temperature information, humidity information, weather information, or event information. Note that examples of the power transaction market include transaction markets such as a day-ahead market, an intraday market, and a supply/demand balancing power market. Forms that can be applied as the transaction form of power transaction include various transaction forms other than the transaction forms in these power transaction markets.

The control unit 280 causes power transfer to be performed between the vehicle 30 and a second vehicle 30 provided with a battery 32 based on power demand in the power network 10 that supplies power in a region of a future movement destination of the vehicle 30. For example, the control unit 280 causes the second vehicle 30 to supply power to the vehicle 30 if the power demand in the power network 10 is higher than a predetermined value. The control unit 280 may cause the second vehicle 30 to supply power to the vehicle 30 if the difference between the power demand amount in the power network 10 and the power supply amount in the power network 10 is larger than a predetermined value. Thereby, power can be gathered in vehicles 30 heading for the power network 10 where a shortage of power occurs.

The control unit 280 may cause the second vehicle 30 to supply power to the vehicle 30, provided that the remaining power amount of the battery 32 provided to the second vehicle 30 is equal to or larger than a predetermined value. The control unit 280 may use the SOC of the battery 32 as an indicator of the remaining power amount of the battery 32. The control unit 280 may cause the second vehicle 30 to supply power to the vehicle 30, provided that power demand in the power network 10 that supplies power in a region of a future movement destination of the second vehicle 30 is lower than a predetermined value.

The control unit 280 causes the second vehicle 30 to receive power from the vehicle 30 if the power demand in the power network 10 that supplied power in the region of the future movement destination of the vehicle 30 is lower than the predetermined value. For example, the control unit 280 causes the second vehicle 30 to receive power from the vehicle 30, provided that the remaining power amount of the battery 32 provided to the second vehicle 30 is equal to or larger than a predetermined value. The control unit 280 may cause the second vehicle 30 to receive power from the vehicle 30, provided that the power demand in the power network 10 that supplies power in a region of a future movement destination of the second vehicle 30 is higher than a predetermined value. The control unit 280 may cause the vehicle 30 to supply power to the second vehicle 30 if the difference between the amount of power supply from the power generation facility 12 in the power network 10 and the power demand amount in the power network 10 is larger than a predetermined value. Thereby, the rechargeable capacities of batteries 32 of vehicles 30 heading for the power network 10 where an excess of power occurs can be increased.

The period predicting unit 220 predicts a period over which the vehicle 30 will be present in a movement destination region. For example, the period predicting unit 220 predicts a period over which the vehicle 30 will be present in the movement destination region, based on the current position of the vehicle 30, and a movement history of the vehicle 30. For example, the period predicting unit 220 may predict a period over which the vehicle 30 will be present in the movement destination region based on the movement history information stored in the history storage unit 284, the schedule information stored in the schedule information storage unit 282, and destination information about the vehicle 30. The control unit 280 causes power transfer to be performed between the vehicle 30 and the second vehicle 30 based on power demand in the power network 10 during the period.

The user information storage unit 286 stores information indicating a lower limit value of a suppliable power capacity that should be kept in the battery 32 provided to the vehicle 30 for a user of the vehicle 30. If power is supplied from the battery 32 provided to the vehicle 30 to the second vehicle 30, the control unit 280 supplies power from the battery 32 provided to the vehicle 30 to the second vehicle 30 such that the suppliable power capacity of the battery 32 provided to the vehicle 30 does not fall below the lower limit value. Thereby, the minimum necessary power amount can be kept in the vehicle 30.

If the power transfer between the vehicle 30 and the second vehicle 30 was performed, the consideration control unit 270: generates information about a consideration for the fact that the power transfer between the vehicle 30 and the second vehicle 30 was performed; and associates the information about the consideration with at least one of the second vehicle 30 and the user 80 of the second vehicle 30. If the vehicle 30 was made available for power transfer with the power network 10 that supplies power in the region of the movement destination of the vehicle 30 after the power transfer between the vehicle 30 and the second vehicle 30 was performed, the consideration control unit 270 may: generate information about a consideration for the fact that the vehicle 30 has been made available for power transfer with the power network 10; and associate the information about the consideration with at least one of the vehicle 30 and the user 80 of the vehicle 30. Note that the consideration control unit 270 may associate the information about the consideration with any information that can identify the user 80 of the vehicle 30 or the second vehicle 30.

Note that the control unit 280 communicates with the ECU of the vehicle 30 to successively acquire power transferability information indicating whether or not the vehicle 30 is connected to a charge/discharge facility 20 available for power transfer with the power network 10. If the vehicle 30 is available for power transfer with the power network 10, the control unit 280 instructs the ECU provided to the vehicle 30 to perform charge/discharge of the battery 32 according to power demand indicated by information acquired by the demand information acquiring unit 290. The ECU of the vehicle 30 communicates with the charge/discharge facility 20 according to the instruction of the control unit 280, and controls a power converter of the vehicle 30 to perform charge of the battery 32 through the charge/discharge facility 20 or release of power obtained through discharge of the battery 32. Note that the control unit 280 may successively acquire, from the ECU of the vehicle 30, information indicating: an amount of power input from the charge/discharge facility 20 to the power converter at the time of charge of the battery 32; an amount of power output from the power converter to the charge/discharge facility 20 at the time of discharge of the battery 32; and the SOC (State of Charge) of the battery 32. The control unit 280 may control power transfer between the vehicle 30 and the power network 10 based on the information acquired from the ECU of the vehicle 30.

Note that functions of the control apparatus in the present invention may be realized singly by the managing server 40 or may be realized by a combination of the managing server 40 and the ECU of the vehicle 30. For example, at least some of the functions for processes executed by the managing server 40 in the present embodiment may be executed by the ECU of the vehicle 30. For example, at least some of processes executed by the control unit 280, movement destination acquiring unit 210, period predicting unit 220, consideration control unit 270, and notification control unit 260 may be executed by the ECU of the vehicle 30.

If it is predicted that a shortage of power will occur in the power network 10 of a movement destination of the vehicle 30, it is possible with the managing server 40 to gather power in the vehicle 30 from the second vehicle 30. In addition, if it is predicted that an excess of power will occur in the power network 10 of a movement destination of the vehicle 30, it is possible in advance to increase the rechargeable capacity of the battery 32 of the vehicle 30 by transferring power to the battery 32 of the second vehicle 30. Because of this, it is possible to perform power transfer between the battery 32 of the vehicle 30 and the power network 10 of a movement destination of the vehicle 30 according to power demand in the power network 10. This contributes to stabilization of the power network 10.

FIG. 3 illustrates, in a table format, one example of schedule information stored in the schedule information storage unit 282. The schedule information associates a vehicle ID, a scheduled period, and a connection destination ID with each other.

As the vehicle ID, identification information of the vehicle 30 is stored. As the scheduled period, information about a period over which the vehicle 30 is kept connected to the charge/discharge facility 20 is stored. The period information includes information indicating the start date/time, and end date/time of the period over which the vehicle 30 is kept connected to the charge/discharge facility 20. As the connection destination ID, identification information of the charge/discharge facility 20 to which the vehicle 30 is connected is stored.

The user 80 may register, in the user terminal 82, the charge/discharge facility 20 that the user 80 is planning to connect the vehicle 30 to, and information indicating the scheduled period therefor. The user terminal 82 sends, to the managing server 40, the identification information of the charge/discharge facility 20 registered by the user 80, the information indicating the scheduled period, and the identification information of the vehicle 30 registered with the user terminal 82. The managing server 40 generates schedule information based on the information received from the user terminal 82 to store the schedule information in the schedule information storage unit 282.

In the managing server 40, based on the schedule information, the movement destination acquiring unit 210, and period predicting unit 220 predict a movement destination of the vehicle 30, and a period over which the vehicle 30 will be kept stopped at the movement destination. For example, the movement destination acquiring unit 210 predicts the position of the charge/discharge facility 20 identified with the connection destination ID as the movement destination of the vehicle 30. In addition, the period predicting unit 220 predicts the period indicated by the scheduled period as the period over which the vehicle 30 will be kept stopped at the movement destination.

FIG. 4 illustrates, in a table format, one example of movement history information stored in the history storage unit 284. The movement history information associates a vehicle ID, a time, a battery SOC, a vehicle position, and a vehicle state with each other.

As the time, information indicating the time or period at which or during which a history is acquired is stored. As the battery SOC, information indicating the SOC of the battery 32 is stored. As the vehicle position, information indicating the position of the vehicle 30 is stored. Examples of the positional information include, in addition to geographic information such as latitude/longitude information, any information that allows identification of the position of the vehicle 30 or the like such as identification information of the charge/discharge facility 20 to which the vehicle 30 is connected or information indicating whether or not the vehicle 30 is at home. As the vehicle state, information indicating the state of the vehicle 30 is stored. Examples of the state of the vehicle 30 include "stopped", "started travelling", "travelling", "started charging", "charging", "ended charging", and the like. The managing server 40 may successively receive, from the ECU of the vehicle 30, vehicle data acquired at the ECU of the vehicle 30 to generate the movement history information based on the received vehicle data.

In the managing server 40, based on the movement history information stored in the history storage unit 284, the movement destination acquiring unit 210, and period predicting unit 220 predict a movement destination of the vehicle 30, and a period over which the vehicle 30 will be kept stopped at the movement destination. For example, based on the time, vehicle position, and vehicle state included in the movement history information stored in the history storage unit 284, the movement destination acquiring unit 210 analyzes a movement pattern of the vehicle 30, and predicts a movement destination of vehicle 30 based on the movement pattern. For example, the movement destination acquiring unit 210 predicts the position, and vehicle state of the vehicle 30 in each time segment of the next day based on the movement pattern. Based on the position in each time segment predicted by the movement destination acquiring unit 210, and a region where each of the power networks 10 supplies power, the period predicting unit 220 identifies a period over which each of the vehicles 30 is kept stopped in the power supply region of the power network 10 in the future.

FIG. 6 illustrates, in a table format, one example of inter-vehicle power transfer history information stored in the history storage unit 284. The inter-vehicle power transfer history information associates a vehicle ID1, a vehicle ID2, a period, a power transfer amount, and points with each other.

As the vehicle ID1, identification information of the vehicle 30 that performs power transfer with the power network 10 at a movement destination is stored. As the vehicle ID2, identification information of the vehicle 30 that performed power transfer with the vehicle 30 identified with the identification information stored as the vehicle ID1 is stored. As the period, information indicating a period including the time at which the power transfer was performed is stored. As the transferred power, an amount of power transferred between the vehicle 30 identified with the identification information stored as the vehicle ID1, and the vehicle 30 identified with the identification information stored as the vehicle ID2 is stored.

The points indicate points given for the power transfer between the vehicles 30. The points are points given to the vehicle 30 identified with the identification information stored as the vehicle ID2. The vehicle 30 identified with the identification information stored as the vehicle ID1 is not given points for the power transfer between the vehicles 30, and but given points, provided that the vehicle 30 is made available for power transfer with the power network 10 as described below with reference to FIG. 5. The points may be calculated as the sum of fixed points for the fact that power transfer was performed between the vehicles 30, and points that vary according to an amount of power transfer between the vehicles 30.

FIG. 6 illustrates, in a table format, one example of connection history information stored in the history storage unit 284. The connection history information associates a vehicle ID, a connection destination ID, a connection period, a power transfer amount, and points with each other.

As the connection destination ID, identification information of the charge/discharge facility 20 connected to the vehicle 30 is stored. The connection period includes a connection start time, and a connection end time. As the connection start time, information indicating a time at which the vehicle 30 became available for power transfer with the power network 10 is stored. The connection start time may be identified based on power transferability information sent periodically from the charge/discharge ECU of the vehicle 30 to the managing server 40. As the connection start time, a time at which it became possible for the control unit 280 to control charge/discharge of the battery 32 after the charge/discharge cable 22 is attached to the vehicle 30, and charge/discharge facility 20 may be stored.

As the connection end time, information indicating a time at which it became impossible to perform power transfer between the vehicle 30 and the power network 10 is stored. The connection end time may be identified based on power transferability information sent periodically from the charge/discharge ECU of the vehicle 30 to the managing server 40. As the connection end time, information indicating an end time of a period over which the vehicle 30 was kept connected to the charge/discharge facility 20 through the charge/discharge cable 22 may be stored. As the connection end time, information indicating a time at which a power cable was disconnected from at least one of the vehicle 30 and the charge/discharge facility 20 may be stored. As the connection end time, information indicating a time at which it became impossible for the control unit 280 to control charge/discharge of the battery 32 may be stored.

As the power transfer amount, information indicating an amount of power transferred between the vehicle 30 and the power network 10 from the connection start time to the connection end time is stored.

The points indicate a consideration given for the fact that the vehicle 30 became available for power transfer with the power network 10. For example, the points are calculated as the sum of fixed points for the fact that power transfer was possible between the vehicle 30 and the power network 10, and points that vary according to an amount of power transfer with the power network 10.

Note that the points explained with reference to FIG. 5, and FIG. 6 may be added up every month for each user 80 of a vehicle 30, and a monthly usage fee of the charge/discharge facility 20 to be billed to the user 80 of the vehicle 30 may be reduced according to the points that are added up.

FIG. 7 illustrates, in a table format, one example of user information stored in the user information storage unit 286. The user information associates a vehicle ID, a lower limit capacity, and an upper limit capacity with each other.

The lower limit capacity indicates a capacity that should be kept in the battery 32 for use by the user 80. For example, if the lower limit capacity is 30 kWh, when controlling charge/discharge of the battery 32, the control unit 280 performs control such that the SOC of the battery 32 does not fall below the SOC corresponding to 30 kW. For example, if the battery 32 is being caused to discharge power, the control unit 280 stops the discharge of the battery 32 if the SOC of the battery 32 reached the SOC corresponding to 30 kW.

The upper limit capacity indicates an upper limit value of the capacity that can be reached in the battery 32 with power transfer controlled by the control unit 280. The control unit 280 performs control such that the SOC of the battery 32 does not exceed the SOC corresponding to 50 kW. For example, if the battery 32 is being charged, the control unit 280 stops charge of the battery 32 if the SOC of the battery 32 reached the SOC corresponding to 50 kW.

In this manner, if the battery 32 is to be charged or caused to discharge power, the control unit 280 performs control such that the remaining capacity of the battery 32 stays within the capacity range from the lower limit capacity to the upper limit capacity. Thereby, it is possible to make the battery 32 keep a minimum power amount necessary for the user 80 of the vehicle 30 while the battery 32 is charged or caused to discharge power according to the power demand amount or amount of excess power of the power network 10 of a movement destination of the vehicle 30. Note that the lower limit capacity, and upper limit capacity may be specified by the user 80. For example, the user 80 specifies the lower limit capacity, and upper limit capacity by telling a dealer the lower limit capacity, and upper limit capacity at the time of purchase of the vehicle 30. The lower limit capacity, and upper limit capacity specified by the user 80 may be sent to the managing server 40 through a terminal of the dealer, and registered with the user information storage unit 286.

Figure 8:
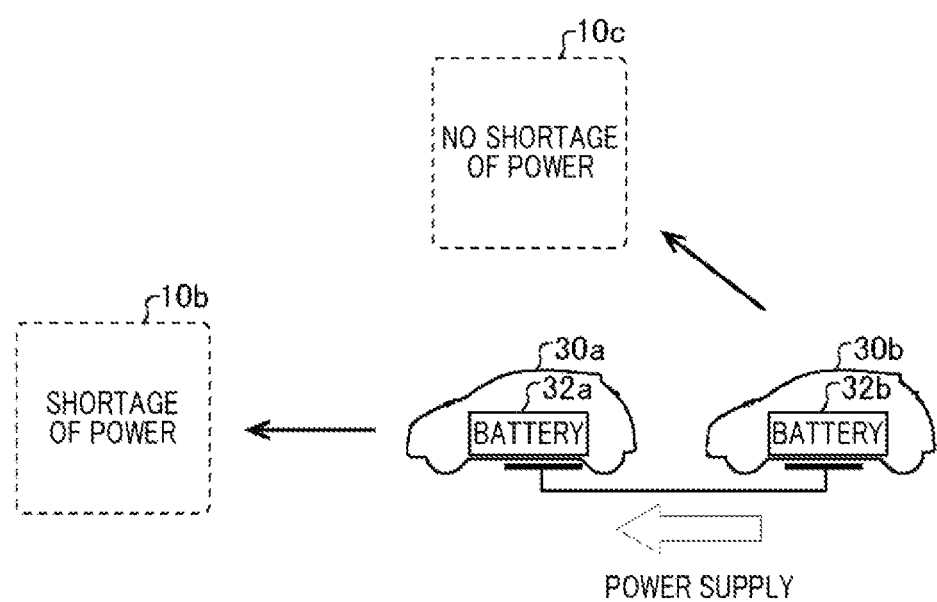
FIG. 8 is a schematic diagram for explaining one example of situations where inter-vehicle power transfer is controlled based on power demand at a movement destination.

FIG. 8 is a schematic diagram for explaining one example of situations where inter-vehicle power transfer is controlled based on power demand at a movement destination. As illustrated in FIG. 8, it is predicted that there will be a shortage of power in the power network 10b of a movement destination of the vehicle 30a in a time segment in which the vehicle 30a is kept stopped. On the other hand, it is predicted that there will not be a shortage of power in the power network 10c of a movement destination of the vehicle 30b in a time segment in which the vehicle 30b is kept stopped. Here, it is assumed that the vehicle 30a, and vehicle 30b are stopped waiting for a traffic light or for any other reason, and are available for charge/discharge therebetween.

In this case, the control unit 280 causes the battery 32b of the vehicle 30b to discharge power, and causes the battery 32a of the vehicle 30a to be charged. Thereby, it is possible to cause the vehicle 30a to supply power to the power network 10b after the vehicle 30a moved to the region of the power network 10b. Thereby, a shortage of power in the future in the power network 10b can be mitigated.

Figure 9:
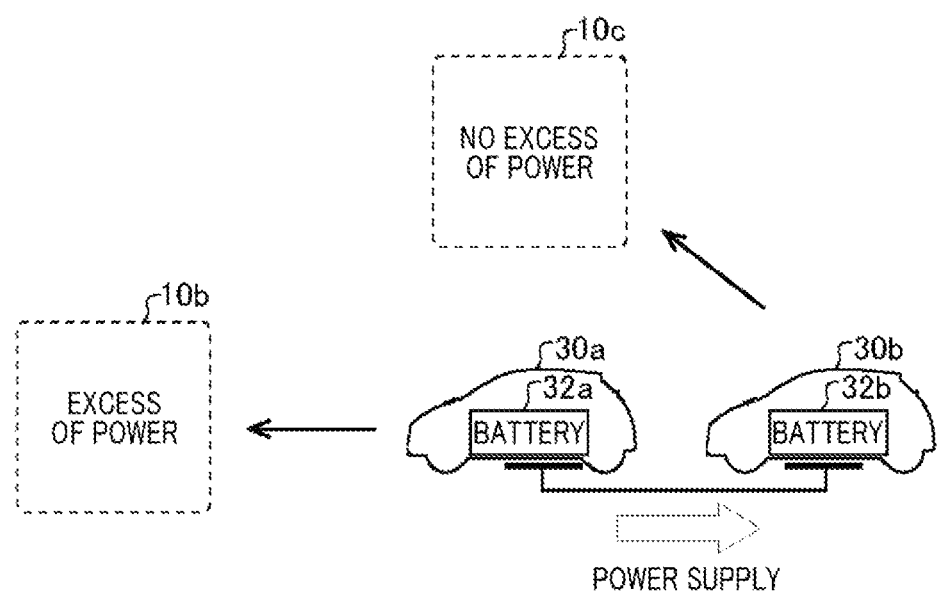
FIG. 9 is a schematic diagram for explaining another example of situations where inter-vehicle power transfer is controlled based on power demand at a movement destination.

FIG. 9 is a schematic diagram for explaining another example of situations where inter-vehicle power transfer is controlled based on power demand at a movement destination. As illustrated in FIG. 9, it is predicted that there will be an excess of power in the power network 10b of a movement destination of the vehicle 30a in a time segment in which the vehicle 30a is kept stopped. On the other hand, it is predicted that there will not be an excess of power in the power network 10c of a movement destination of the vehicle 30b in a time segment in which the vehicle 30b is kept stopped. Here, it is assumed that the vehicle 30a, and vehicle 30b are stopped waiting for a traffic light or for any other reason, and are available for charge/discharge therebetween.

In this case, the control unit 280 causes the battery 32a of the vehicle 30a to discharge power, and causes the battery 32b of the vehicle 30b to be charged. Thereby, it is possible to cause excess power of the power network 10b to be absorbed by the vehicle 30a after the vehicle 30a moved to the region of the power network 10b. Thereby, an excess of power in the future in the power network 10b can be mitigated.

Figure 10:
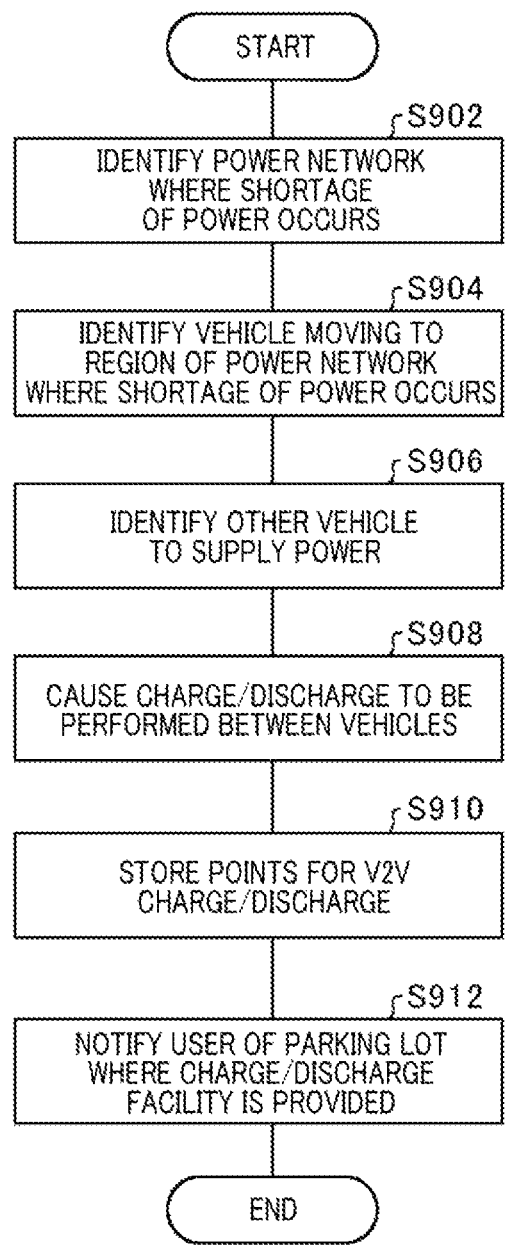
FIG. 10 is a flowchart related to processes at the managing server 40.

FIG. 10 is a flowchart related to processes at the managing server 40. The processes in this flowchart are executed mainly at the processing unit 42 of the managing server 40. The processes in this flowchart may be executed periodically by the managing server 40, for example.

At S902, the control unit 280 identifies power network 10 at which shortages of power will occur in the future. For example, the control unit 280 identifies a time segment in which a shortage of power will occur in each of the power networks 10, based on power demand of each time segment in the power network 10 acquired by the demand information acquiring unit 290. For example, the control unit 280 identifies a time segment in which a shortage of power will occur in each of the power networks 10, based on bidding information, contract information or power supply/demand information of a power transaction corresponding to the power network 10 acquired by the demand information acquiring unit 290.

At S904, the control units 280 identifies a vehicle 30 to move to the power network 10 in which the shortage of power will occur. Specifically, the movement destination acquiring unit 210, and period predicting unit 220 predict a movement destination of each of vehicles 30, and a period over which the vehicle 30 is kept stopped in the movement destination, based on movement history information, reservation information or the like or destination information or the like. The movement destination acquiring unit 210, and period predicting unit 220 predict a movement destination, and a period over which a vehicle 30 is kept stopped in the movement destination, based on information stored in the schedule information storage unit 282, and history storage unit 284, and destination information set for a navigation device of the vehicle 30. The control unit 280 identifies, as a vehicle 30 to move to the power network 10 in which a shortage of power will occur, a vehicle 30: whose movement destination predicted by the movement destination acquiring unit 210 is included in a power supply region of the power network 10 in which the shortage of power is predicted to occur; and which the period predicting unit 220 predicted will be kept stopped in the period over which the shortage of power is predicted to occur in the power network 10.

At S906, the control units 280 identifies a second vehicle 30 that is caused to supply power to the vehicle 30 to move to the power network 10 in which the shortage of power will occur. For example, if a shortage of power is predicted to occur in the power network 10b, and a movement destination of the vehicle 30a is included in a power supply region of the power network 10b, the control unit 280 selects a second vehicle 30 to be caused to supply power to the vehicle 30a from vehicles 30 positioned near the vehicle 30a. For example, if the vehicle 30b is positioned near the vehicle 30a, the control unit 280 selects the vehicle 30b as a vehicle to be caused to supply power to the vehicle 30a, provided that the remaining capacity of the battery 32 of the vehicle 30b is equal to or higher than a predetermined value, and it is predicted that a shortage of power will not occur in the power network 10c of the movement destination of the vehicle 30b in a period in which the vehicle 30b is predicted to be kept stopped in the power supply region of the power network 10c.

At S908, the control unit 280 causes the second vehicle 30 identified at S906 to supply power to the vehicle 30 identified at S904 via inter-vehicle power transfer. For example, the control unit 280 notifies the ECUs of both the vehicles 30 that the vehicles 30 are expected to perform charge/discharge of the batteries 32 between them.

At S910, the consideration control unit 270 calculates points for charge/discharge between the vehicles performed at S908, and stores information indicating the point in inter-vehicle power transfer history information. Specifically, the consideration control unit 270 calculates points given to the second vehicle 30 identified at S906, based on an amount of power transfer between the vehicles 30 via the charge/discharge performed at S908. Then, the consideration control unit 270 stores, in the inter-vehicle power transfer history information, identification information of the vehicle 30 identified at S904, identification information of the second vehicle 30 identified at S906, information indicating a period over which charge/discharge was performed between the vehicle 30 at S908, information indicating the amount of power transfer between the vehicles 30 via the charge/discharge between the vehicles 30 performed at S908, and information indicating the calculated points.

At S912, the notification control unit 260 causes information to be notified, the information indicating a parking lot where a charge/discharge facility 20 available for power transfer with the power network 10 identified at S902 is provided. For example, the notification control unit 260 causes information to be sent to the user terminal 82a of the user 80a, the information indicating the position of the parking lot where the charge/discharge facility 20b available for power transfer with the power network 10b is provided.

Figure 11:
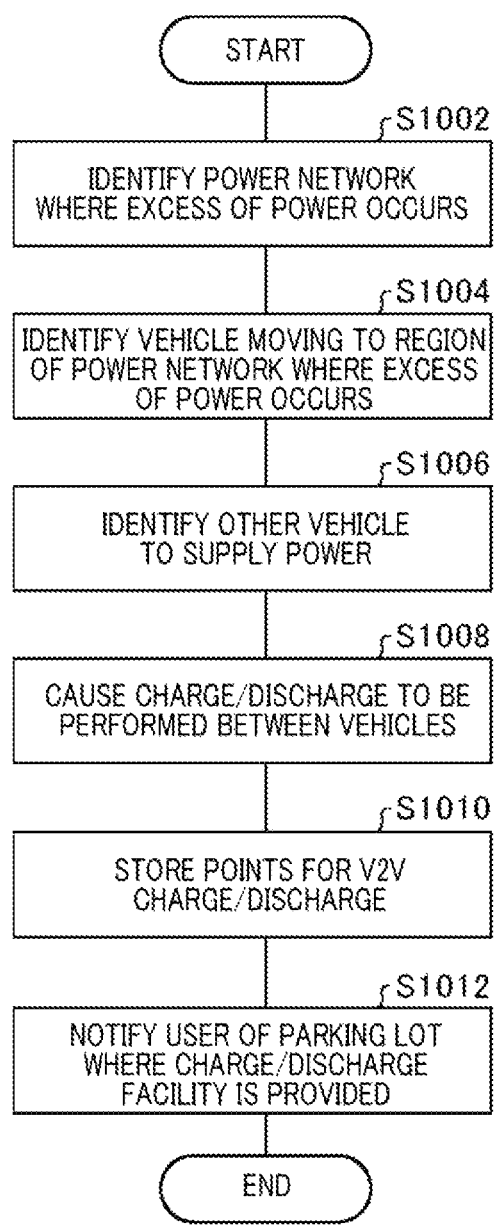
FIG. 11 is another flowchart related to processes at the managing server 40.

FIG. 11 is another flowchart related to processes at the managing server 40. The processes in this flowchart are executed mainly at the processing unit 42 of the managing server 40. The processes in this flowchart may be executed periodically by the managing server 40, for example.

At S1002, the control unit 280 identifies power network 10 at which excesses of power will occur in the future. For example, the control unit 280 identifies a time segment in which an excess of power will occur in each of the power networks 10, based on power demand of each time segment in the power network 10 acquired by the demand information acquiring unit 290. For example, the control unit 280 identifies a time segment in which an excess of power will occur in each of the power networks 10, based on bidding information, contract information or power supply/demand information of a power transaction corresponding to the power network 10 acquired by the demand information acquiring unit 290.

At S1004, the control units 280 identifies a vehicle 30 to move to the power network 10 in which the excess of power will occur. Specifically, the movement destination acquiring unit 210, and period predicting unit 220 predict a movement destination of each of vehicles 30, and a period over which the vehicle 30 is kept stopped in the movement destination, based on movement history information, reservation information or the like or destination information or the like. The movement destination acquiring unit 210, and period predicting unit 220 predict a movement destination, and a period over which a vehicle 30 is kept stopped in the movement destination, based on information stored in the schedule information storage unit 282, and history storage unit 284, and destination information set for a navigation device of the vehicle 30. The control unit 280 identifies, as a vehicle 30 to move to the power network 10 in which an excess of power will occur, a vehicle 30: whose movement destination predicted by the movement destination acquiring unit 210 is included in a power supply region of the power network 10 in which the excess of power is predicted to occur; and which the period predicting unit 220 predicted will be kept stopped in the period over which the excess of power is predicted to occur in the power network 10.

At S1006, the control units 280 identifies a second vehicle 30 that is caused to receive power supply from the vehicle 30 to move to the power network 10 in which the excess of power will occur. For example, if an excess of power is predicted to occur in the power network 10b, and a movement destination of the vehicle 30a is included in a power supply region of the power network 10b, the control unit 280 selects a second vehicle 30 to be caused to receive power supply from the vehicle 30a from vehicles 30 positioned near the vehicle 30a. For example, if the vehicle 30b is positioned near the vehicle 30a, the control unit 280 selects the vehicle 30b as a vehicle to be caused to receive power supply from the vehicle 30a, provided that the remaining capacity of the battery 32 of the vehicle 30b is equal to or lower than a predetermined value, and it is predicted that an excess of power will not occur in the power network 10c of the movement destination of the vehicle 30b in a period in which the vehicle 30b is predicted to be kept stopped in the power supply region of the power network 10c.

At S1008, the control unit 280 caused the vehicle 30 identified at S1004 to supply power to the second vehicle 30 identified at S1006 via inter-vehicle power transfer. For example, the control unit 280 notifies the ECUs of both the vehicles 30 that the vehicles 30 are expected to perform charge/discharge of the batteries 32 between them.

At S1010, the consideration control unit 270 calculates points for charge/discharge between the vehicles performed at S1008, and stores information indicating the point in inter-vehicle power transfer history information. Specifically, the consideration control unit 270 calculates points given to the second vehicle 30 identified at S1006, based on an amount of power transfer between the vehicles 30 via the charge/discharge performed at S1008. Then, the consideration control unit 270 stores, in the inter-vehicle power transfer history information, identification information of the vehicle 30 identified at S1004, identification information of the second vehicle 30 identified at S1006, information indicating a period over which charge/discharge was performed between the vehicle 30 at S1008, information indicating the amount of power transfer between the vehicles 30 via the charge/discharge between the vehicles 30 performed at S1008, and information indicating the calculated points.

At S1010, the notification control unit 260 causes information to be notified to the user 80 of the vehicle 30 identified at S1004, the information indicating a parking lot where a charge/discharge facility 20 available for power transfer with the power network 10 identified at S1002 is provided. For example, the notification control unit 260 causes information to be sent to the user terminal 82a of the user 80a, the information indicating the position of the parking lot where the charge/discharge facility 20b available for power transfer with the power network 10b is provided.

Figure 12:
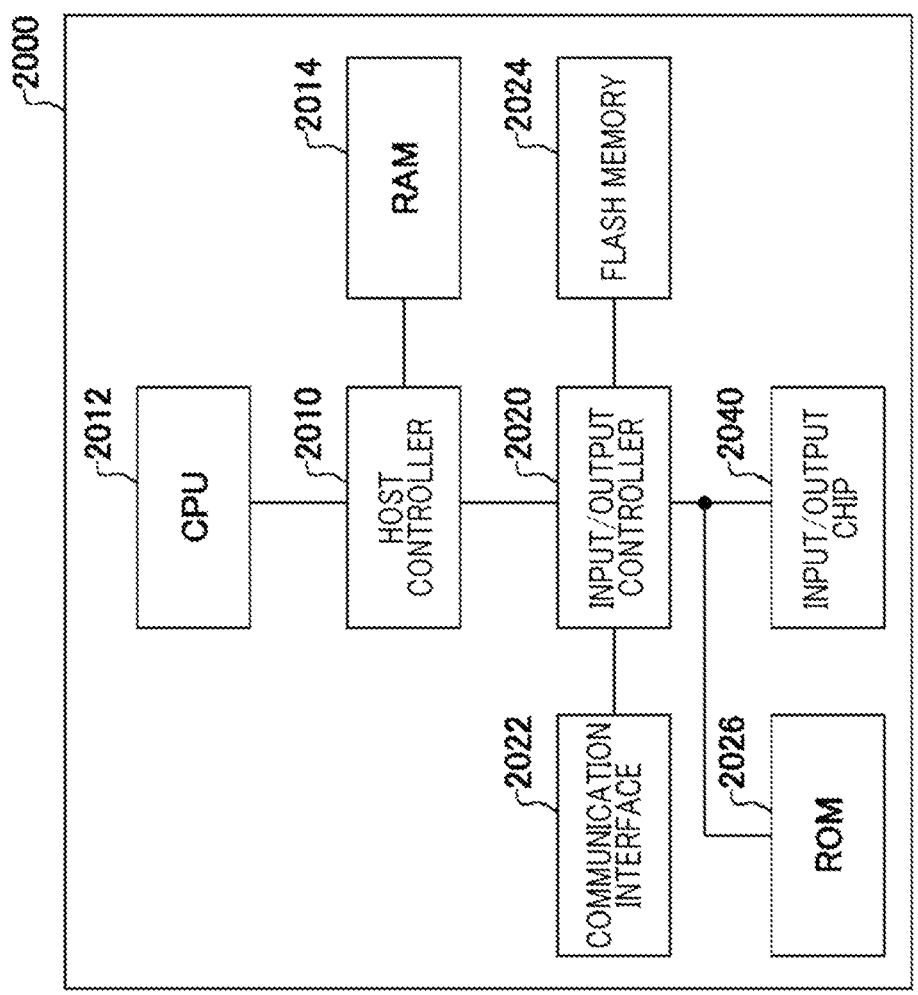
FIG. 12 shows an example of a computer 2000 in which embodiments of the present invention may be wholly or partly embodied.

FIG. 12 shows an example of a computer 2000 in which embodiments of the present invention may be wholly or partly embodied. A program that is installed in the computer 2000 can cause the computer 2000 to function as or perform operations associated with apparatuses such as the managing server 40 of the embodiments or sections thereof, and/or cause the computer 2000 to perform processes of the embodiments of the present invention or steps thereof. Such a program may be executed by the CPU 2012 to cause the computer 2000 to perform certain operations associated with some or all of the blocks of flowcharts and block diagrams described herein.

The computer 2000 according to the present embodiment includes a CPU 2012, and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via the input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may also connect various input/output units such as a keyboard, a mouse and a monitor to the input/output controller 2020 via an input/output port such as a serial port, a parallel port, a keyboard port, a mouse port, a monitor port, a USB port, an HDMI (registered trademark) port and the like.

A program is provided via a computer-readable medium such as a CD-ROM, a DVD-ROM, or a memory card or a network. The RAM 2014, the ROM 2026, or the flash memory 2024 is an example of the computer-readable medium. The program is installed in the flash memory 2024, the RAM 2014, or the ROM 2026, and is executed by the CPU 2012. The information processing described in these programs is read into the computer 2000, resulting in cooperation between a program and the above-mentioned various types of hardware resources. An apparatus or method may be constituted by realizing the operation or processing of information in accordance with the usage of the computer 2000.

For example, when communication is performed between the computer 2000 and an external device, the CPU 2012 may execute a communication program loaded onto the RAM 2014 to instruct communication processing to the communication interface 2022, based on the processing described in the communication program. The communication interface 2022, under control of the CPU 2012, reads transmission data stored on a transmission buffering region provided in a recording medium such as the RAM 2014, the hard disk drive 2024, the DVD-ROM 2001, or the IC card, and transmits the read transmission data to a network or writes reception data received from a network to a reception buffering region or the like provided on the recording medium.

In addition, the CPU 2012 may cause all or a necessary portion of a file or a database to be read into the RAM 2014, the file or the database having been stored in an external recording medium such as the flash memory 2024, and perform various types of processing on the data on the RAM 2014. The CPU 2012 may then write back the processed data to the external recording medium.

Various types of information, such as various types of programs, data, tables, and databases, may be stored in the recording medium to undergo information processing. The CPU 2012 may perform various types of processing on the data read from the RAM 2014, which includes various types of operations, processing of information, condition judging, conditional branch, unconditional branch, search/replace of information, etc., as described throughout this disclosure and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The program or software module explained above may be stored on the computer 2000 or a computer-readable medium located near the computer 2000. A recording medium like a hard disk or a RAM provided in a server system connected to a dedicated communication network or the Internet can be used as such a computer-readable medium. The program stored on the computer-readable medium may be provided to the computer 2000 via a network.

The programs that are installed on the computer 2000, and make the computer 2000 function as the managing server 40 may act on the CPU 2012 or the like to make the computer 2000 function as each unit of the managing server 40. Information processing described in these programs are read in by the computer 2000 to thereby make the computer 2000 function as the movement destination acquiring unit 210, the period predicting unit 220, the notification control unit 260, the consideration control unit 270, the control unit 280, the demand information acquiring unit 290, the schedule information storage unit 282, the history storage unit 284, and the user information storage unit 286, which are specific means attained by cooperation between software and various types of hardware resources mentioned above. With these specific means, the unique managing server 40 corresponding to a purpose of use of the computer 2000 in the present embodiment can be constructed by realizing operations on or processing of information corresponding to the purpose of use.

Various embodiments of the present invention may be described with reference to block diagrams and the like whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises at least part of an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing device, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. In addition, matters explained about a particular embodiment can be applied to another embodiment as long as such application does not cause technological contradictions. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: power network
12: power generation facility
14: stationary battery
20: charge/discharge facility
22: charge/discharge cable
30: vehicle
32: battery
40: managing server
42: processing unit
46: communicating unit
48: storage unit
50: power transaction server
80: user
82: user terminal
100: power transfer system
210: movement destination acquiring unit
220: period predicting unit
260: notification control unit
270: consideration control unit
280: control unit
282: schedule information storage unit
284: history storage unit
286: user information storage unit
290: demand information acquiring unit
2000: computer
2010: host controller
2012: CPU
2014: RAM
2020: input/output controller
2022: communication interface
2024: flash memory
2026: ROM
2040: input/output chip

What is claimed is:

1. A control apparatus comprising:
a movement destination information acquiring unit that acquires information indicating a future movement destination of a vehicle provided with a driving power source; and
a control unit that causes power transfer to be performed between the vehicle and a second vehicle provided with a driving power source based on a power demand in a power network that supplies power in a region of the future movement destination of the vehicle.

2. The control apparatus according to claim 1, wherein the control unit causes power to be supplied from the second vehicle to the vehicle if the power demand in the power network is higher than a predetermined value.

3. The control apparatus according to claim 2, wherein the control unit causes power to be supplied from the second vehicle to the vehicle, provided that a remaining power amount of the driving power source provided to the second vehicle is equal to or larger than a predetermined value.

4. The control apparatus according to claim 2, wherein the control unit causes power to be supplied from the second vehicle to the vehicle, provided that the power demand in the power network that supplies power in the region of the future movement destination of the second vehicle is lower than a predetermined value.

5. The control apparatus according to claim 2, further comprising a storage unit that stores information indicating a lower limit value of a suppliable power capacity that should be kept in the driving power source provided to the vehicle for a user of the vehicle,
if the power is supplied from the driving power source provided to the vehicle to the second vehicle, the control unit supplies power from the driving power source provided to the vehicle to the second vehicle such that the suppliable power capacity of the driving power source provided to the vehicle does not fall below the lower limit value.

6. The control apparatus according to claim 1, wherein the control unit causes the second vehicle to receive power from the vehicle if the power demand in the power network that supplies power in the region of the future movement destination of the vehicle is lower than a predetermined value.

7. The control apparatus according to claim 6, wherein the control unit causes the second vehicle to receive power from the vehicle, provided that a remaining power amount of the driving power source provided to the second vehicle is equal to or larger than a predetermined value.

8. The control apparatus according to claim 6, wherein the control unit causes the second vehicle to receive from the vehicle, provided that a power demand in a power network that supplies power in a region of a future movement destination of the second vehicle is higher than a predetermined value.

9. The control apparatus according to claim 1, further comprising a period predicting unit that predicts a period over which the vehicle will be present in the region of the movement destination, wherein
the control unit causes power transfer to be performed between the vehicle and the second vehicle based on a power demand in the power network during the period.

10. The control apparatus according to claim 9, wherein the period predicting unit predicts the period over which the vehicle will be present in the region of the movement destination based on a current position of the vehicle, and a movement history of the vehicle.

11. The control apparatus according to claim 1, further comprising a consideration control unit that: generates information about a consideration for a fact that the power transfer has been performed between the vehicle and the second vehicle if the power transfer has been performed between the vehicle and the second vehicle; and associates the information about the consideration with at least one of the second vehicle and a user of the second vehicle.

12. The control apparatus according to claim 11, wherein if the vehicle is made available for power transfer with the power network that supplies power in the region of the movement destination of the vehicle after the power transfer between the vehicle and the second vehicle has been performed, the consideration control unit: generates information about a consideration for a fact that the vehicle has been made available for power transfer with the power network; and associates the information about the consideration with at least one of the vehicle and a user of the vehicle.

13. The control apparatus according to claim 1, wherein the driving power source is a battery.

14. A non-transitory computer-readable storage medium having stored thereon a program for causing a computer to function as:
- a movement destination information acquiring unit that acquires information indicating a future movement destination of a vehicle provided with a driving power source; and
- a control unit that causes power transfer to be performed between the vehicle and a second vehicle provided with a driving power source based on a power demand in a power network that supplies power in a region of the future movement destination of the vehicle.

* * * * *